United States Patent
Yang et al.

(10) Patent No.: US 12,494,829 B2
(45) Date of Patent: Dec. 9, 2025

(54) BEAM TRAINING METHOD AND APPARATUS, TERMINAL DEVICE, AND NETWORK DEVICE

(71) Applicant: VIVO MOBILE COMMUNICATION CO., LTD., Guangdong (CN)

(72) Inventors: Kun Yang, Guangdong (CN); Dajie Jiang, Guangdong (CN); Hao Liu, Guangdong (CN); Rakesh Tamrakar, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 407 days.

(21) Appl. No.: 18/163,334

(22) Filed: Feb. 2, 2023

(65) Prior Publication Data
US 2023/0179277 A1 Jun. 8, 2023

Related U.S. Application Data

(63) Continuation of application No. PCT/CN2021/108993, filed on Jul. 28, 2021.

(30) Foreign Application Priority Data

Aug. 3, 2020 (CN) .......................... 202010769022.X

(51) Int. Cl.
H04B 7/06 (2006.01)

(52) U.S. Cl.
CPC ......... H04B 7/0617 (2013.01); H04B 7/0626 (2013.01); H04B 7/0682 (2013.01)

(58) Field of Classification Search
CPC .. H04B 7/0617; H04B 7/0626; H04B 7/0682; H04B 7/06952; H04B 7/0897; H04B 7/0695; H04B 7/0408; H04W 24/10
See application file for complete search history.

(56) References Cited

U.S. PATENT DOCUMENTS

2014/0098689 A1 4/2014 Lee et al.
2020/0029292 A1* 1/2020 Zou .................... H04W 76/27
(Continued)

FOREIGN PATENT DOCUMENTS

CN 109996265 A 7/2019
CN 110278017 A 9/2019
(Continued)

OTHER PUBLICATIONS

Boyu Ning, Student Member, IEEE, Zhi Chen, Senior Member, IEEE, Wenrong Chen, Yiming Du, and Jun Fang, Senior Member, IEEE, "Channel Estimation and Hybrid Beamforming for Reconfigurable Intelligent Surfaces Assisted THz Communications", arXiv:1912.11662v1 [cs.IT], Dec. 25, 2019.
(Continued)

*Primary Examiner* — Ayodeji O Ayotunde
(74) *Attorney, Agent, or Firm* — Price Heneveld LLP

(57) ABSTRACT

This application discloses a beam training method and apparatus, a terminal device, and a network device. The beam training method in this application includes: measuring at least two reference signals used for beam training and forwarded by an auxiliary device in at least two forwarding modes to obtain measurement information, where the measurement information is used for indicating an optimal forwarding mode of the auxiliary device, and a forwarding mode of the auxiliary device is determined by using a beam direction of a forwarded signal of the auxiliary device and a beam phase of the forwarded signal of the auxiliary device; and reporting the measurement information to a network device.

20 Claims, 5 Drawing Sheets

(56) References Cited

U.S. PATENT DOCUMENTS

| | | | |
|---|---|---|---|
| 2020/0076488 A1 | 3/2020 | Brunel | |
| 2020/0245166 A1 | 7/2020 | Kwak et al. | |
| 2023/0283337 A1* | 9/2023 | He | H04B 7/0617 370/252 |

FOREIGN PATENT DOCUMENTS

| | | |
|---|---|---|
| CN | 111093267 A | 5/2020 |
| CN | 111245492 A | 6/2020 |
| CN | 111245493 A | 6/2020 |
| CN | 111917448 A | 11/2020 |
| JP | 2015536099 A | 12/2015 |
| JP | 2020036320 A | 3/2020 |
| WO | 2019206157 A1 | 10/2019 |

OTHER PUBLICATIONS

Qingqing Wu and Rui Zhang, "Intelligent Reflecting Surface Enhanced Wireless Network: Joint Active and Passive Beamforming Design", Department of Electrical and Computer Engineering, National University of Singapore, 2018.

Beixiong Zheng, Member, IEEE and Rui Zhang, Fellow, IEEE, Intelligent Reflecting Surface-Enhanced OFDM: Channel Estimation and Reflection Optimization, https://www.ieee.org/publications/rights/index.html, 2162-2337 (c) 2019 IEEE.

A Brief Survey of Mobile Communications through Reconfigurable Intelligent Surfaces, Zhou Ruya et al., Nanjing, China, Jul. 2020.

* cited by examiner

BEAM TRAINING METHOD AND APPARATUS, TERMINAL DEVICE, AND NETWORK DEVICE

CROSS-REFERENCE TO RELATED APPLICATIONS

This application is a continuation application of International Application No. PCT/CN2021/108993 filed on Jul. 28, 2021, which claims priority to Chinese Patent Application No. 202010769022.X filed on Aug. 3, 2020, both of which are incorporated herein by reference in their entireties.

TECHNICAL FIELD

The present disclosure relates to the field of communications technologies, and in particular, to a beam training method and apparatus, a terminal device, and a network device.

BACKGROUND

A future wireless communication system will involve a wireless communication network assisted by an intelligent surface device. A terminal device receives a signal directly from a network device and a signal forwarded by the intelligent surface device. The superposition of a plurality of channels of signals received by the terminal device causes frequency selective fading. A beam scanning function defined by 5G new radio (NR) may be applied to a beam scanning process of an intelligent surface. However, after a beam direction is determined, due to the influence of a multipath environment, in an actual data transmission process, a terminal is still affected by the frequency selective fading caused by the multipath.

SUMMARY

According to a first aspect, a beam training method is provided, applied to a terminal device, and the method including:
measuring at least two reference signals used for beam training and forwarded by an auxiliary device in at least two forwarding modes to obtain measurement information, where the measurement information is used for indicating an optimal forwarding mode of the auxiliary device, and a forwarding mode of the auxiliary device is determined by using a beam direction of a forwarded signal of the auxiliary device and a beam phase of the forwarded signal of the auxiliary device; and
reporting the measurement information to a network device.

According to a second aspect, a beam training method is provided, applied to a network device, and the method including:
transmitting at least two reference signals used for beam training;
obtaining measurement information reported by a terminal device, where the measurement information is obtained after the terminal device measures the at least two reference signals used for beam training and forwarded by an auxiliary device in at least two forwarding modes, and a forwarding mode of the auxiliary device is determined by using a beam direction of a forwarded signal of the auxiliary device and a beam phase of the forwarded signal of the auxiliary device; and
determining an optimal forwarding mode of the auxiliary device according to the measurement information.

According to a third aspect, a beam training apparatus is provided, applied to a terminal device, and the apparatus including:
a first obtaining module, configured to measure at least two reference signals used for beam training and forwarded by an auxiliary device in at least two forwarding modes to obtain measurement information, where the measurement information is used for indicating an optimal forwarding mode of the auxiliary device, and a forwarding mode of the auxiliary device is determined by using a beam direction of a forwarded signal of the auxiliary device and a beam phase of the forwarded signal of the auxiliary device; and
a first reporting module, configured to report the measurement information to a network device.

According to a fourth aspect, a beam training apparatus is provided, applied to a network device, and the apparatus including:
a first transmitting module, configured to transmit at least two reference signals used for beam training;
a second obtaining module, configured to obtain measurement information reported by a terminal device, where the measurement information is obtained after the terminal device measures the at least two reference signals used for beam training and forwarded by an auxiliary device in at least two forwarding modes, and a forwarding mode of the auxiliary device is determined by using a beam direction of a forwarded signal of the auxiliary device and a beam phase of the forwarded signal of the auxiliary device; and
a first determining module, configured to determine an optimal forwarding mode of the auxiliary device according to the measurement information.

According to a fifth aspect, a terminal device is provided, including a processor, a memory, and a program or instruction stored in the memory and executable on the processor, where the program or instruction, when executed by the processor, implements the steps of the method according to the first aspect.

According to a sixth aspect, a network device is provided, including a processor, a memory, and a program or instruction stored in the memory and executable on the processor, where the program or instruction, when executed by the processor, implements the steps of the method according to the second aspect.

According to a seventh aspect, a readable storage medium is provided, storing a program or instruction, where the program or instruction, when executed by a processor, implements the steps of the method according to the first aspect; or implements the steps of the method according to the second aspect.

According to an eighth aspect, a chip is provided, including a processor and a communication interface, where the communication interface is coupled to the processor, and the processor is configured to run a program or instruction on a network device to implement the method according to the first aspect, or implement the method according to the second aspect.

DETAILED DESCRIPTION

The technical solutions in the embodiments of this application are clearly described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In the specification and claims of this application, terms "first" and "second" are used to distinguish similar objects, but are not used to describe a specific sequence or order. It may be understood that the data used in such a way is interchangeable in proper circumstances, so that the embodiments of this application can be implemented in other sequences than the sequence illustrated or described herein. In addition, objects distinguished by "first" and "second" are usually of a type, and the number of objects is not limited. For example, a first object may be one or more than one. In addition, in the specification and claims, "and/or" means at least one of the connected objects, and the character "/" generally indicates an "or" relationship between associated objects.

In a future communication scenario, there are cases in which the coverage of hotspot services, such as a VR, an AR service, and a video service, is enhanced. In such service scenarios, a sufficient communication rate fails to be provided for a terminal by only using the beamforming technology of a base station. Therefore, a new auxiliary node needs to be introduced in a network to enhance a signal strength received by the terminal.

Figure 1:
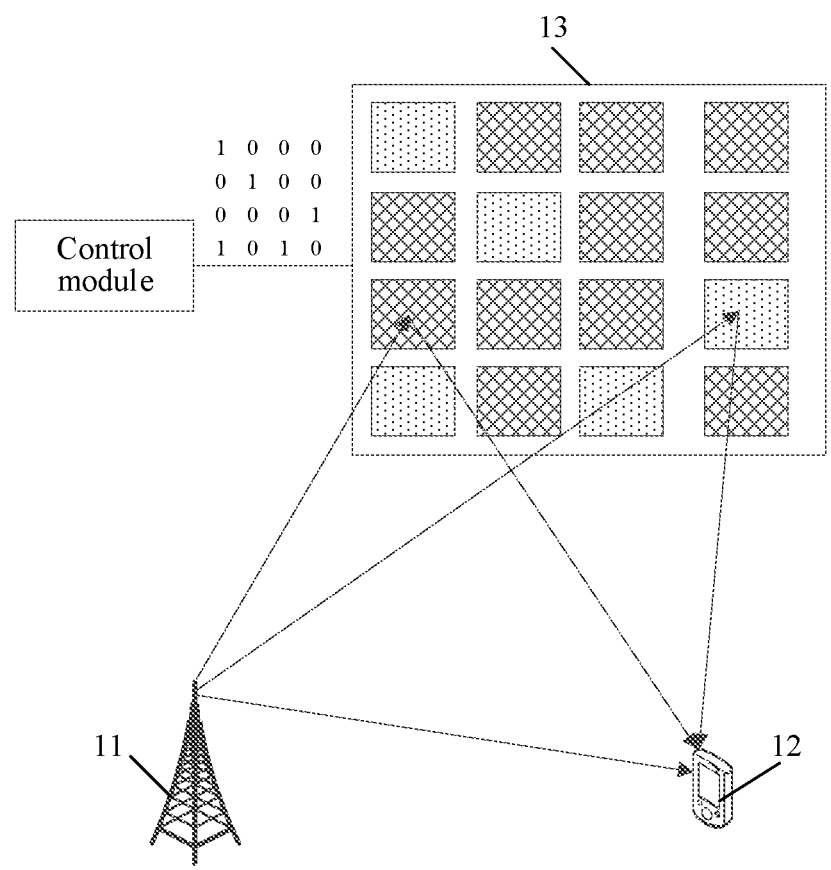
FIG. 1 is a structural diagram of a network system to which an embodiment of this application may be applied.

A large intelligent surface (LIS) is an emerging artificial material device; and the LIS may dynamically or semi-persistently adjust its own electromagnetic properties, affecting a reflection or refraction behavior of electromagnetic waves incident on the LIS. As shown in FIG. 1, the LIS may manipulate a reflection wave/refraction signal of an electromagnetic signal to implement functions such as beam scanning or beamforming.

A principle of beam control based on an intelligent surface 13 is as follows. Using a phase-controlled intelligent surface as an example, an ideal control phase of a device unit (m, n) is:

$$\Delta \phi_{mn} = \frac{2\pi}{\lambda} \left( \left| \vec{d}_{BS} - \vec{d}_{mn} \right| + \left| \vec{d}_{UE} - \vec{d}_{mn} \right| \right),$$

where $\vec{d}_{BS}$, $\vec{d}_{UE}$, and $\vec{d}_{mn}$ are respectively coordinate vectors of a base station 11, a terminal 12, and the device unit (m, n). If a relative location of the terminal and the intelligent surface meets a far-field radiation condition, a signal from the intelligent surface to the terminal is approximately a parallel signal, $|\vec{d}_{UE} - \vec{d}_{mn}| \approx \vec{d}_{UE} \cdot \vec{d}_{mn}$. When the far-field radiation condition is met, a corresponding approximate operation may also be performed between the base station 11 and the intelligent surface 13.

For an intelligent surface of a 1-bit discrete phase control type, an ideal compensation phase is mapped to a discrete phase through discretization processing, for example:

$$\Delta \phi'_{mn} = \begin{cases} +\pi/2 & 0 \le \Delta \phi_{mn} \bmod 2\pi < \pi \\ -\pi/2 & \pi \le \Delta \phi_{mn} \bmod 2\pi < 2\pi \end{cases}.$$

A function of simulated beam scanning is provided in the 5G NR protocol. A basic process is that the base station sequentially transmits signals by using beams in different directions in different time periods, and the terminal receives the signals by using a fixed receiving beam, and selects the most suitable transmission beam to report to the base station.

A beam scanning function defined by the 5G NR may be applied to a beam scanning process of an intelligent surface. However, after a beam direction is determined, due to the influence of a multipath environment, in an actual data transmission process, a terminal is still affected by the frequency selective fading caused by the multipath.

When a signal phase of the base station changes, phase changes of all multipath in the multipath environment are affected, and therefore, the objective of individually controlling a part of multipath cannot be achieved.

An intelligent surface device provides the terminal with a part of multipath signals and may control a phase of a multipath channel. By changing phases of a part of multipath channels, the terminal may reduce the influence of frequency selective fading.

A change of a multipath phase and amplitude of a radio channel is random, slow, and affected by a moving/changing speed of the terminal and an environmental object (usually expressed as a channel coherence time). That is, in a frequency domain, if a section of RB resources falls into frequency selective fading, then, the section of RB is in frequency selective fading for a period of time, and the communication quality is very poor, until other conditions occur in the multipath channel. A conventional communication system avoids frequency selective fading through frequency scheduling. After the introduction of the intelligent surface, the frequency selective fading of a target RB is changed by controlling phases of a part of multipath in the multipath channel. Because the multipath phase control of the intelligent surface is discrete, such as phase control of 0 or π controlled by 1 bit, in a multipath channel with a slowly changing phase, after an optimal multipath phase of an intelligent surface is determined, the optimal multipath phase of the intelligent surface may be effective for a period of time later (to avoid the target RB in frequency selective fading). That is, the adjustment of the optimal multipath phase of the intelligent surface is not particularly frequent.

Figure 2:
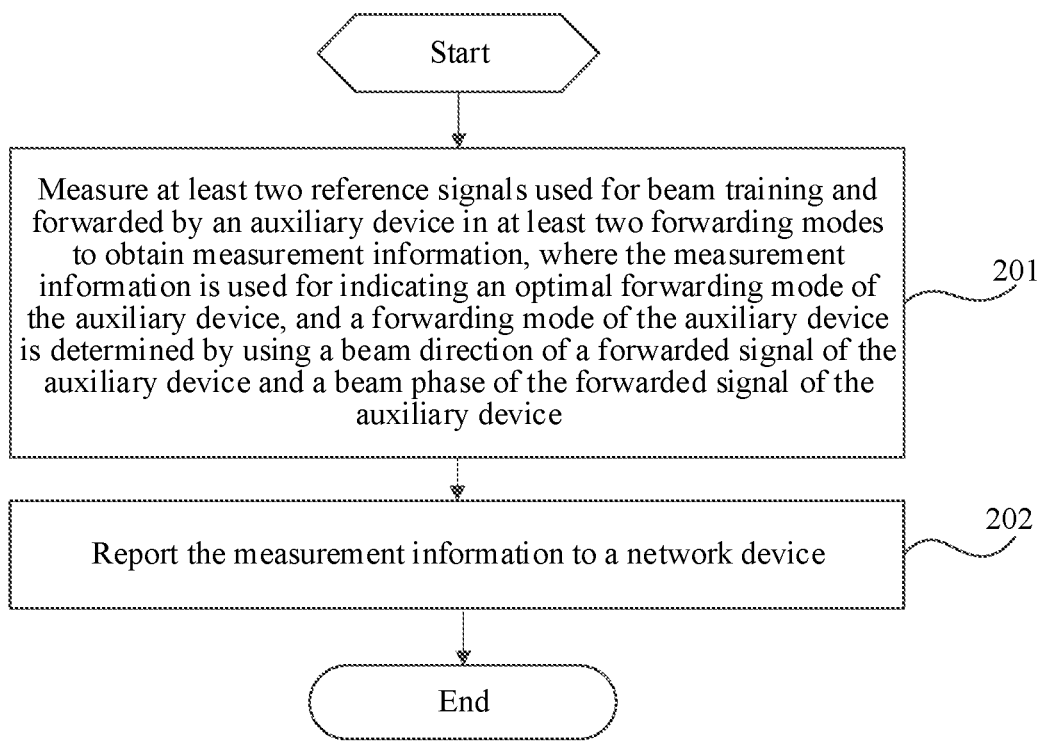
FIG. 2 is a schematic flowchart 1 of a beam training method according to an embodiment of this application.

Based on the foregoing description, this embodiment of this application provides a beam training method, applied to a terminal device. As shown in FIG. 2, the method includes:

Step 201. Measure at least two reference signals used for beam training and forwarded by an auxiliary device in at least two forwarding modes to obtain measurement information, where the measurement information is used for indicating an optimal forwarding mode of the auxiliary device, and a forwarding mode of the auxiliary device is determined by using a beam direction of a forwarded signal of the auxiliary device and a beam phase of the forwarded signal of the auxiliary device. It may be understood that, a beam direction of the auxiliary device represents spatial energy distribution characteristics of a forwarded signal; and a beam phase of the auxiliary device represents a relative phase of a forwarded signal in a target direction or in a direction with the strongest energy, that is, a difference between a phase of a signal at the same observation point in a target direction and a phase of an emitting signal of the network device. The difference between different beam phases meets an integer multiple of $2\pi/M$, where M is a quantity of beam phases.

The reference signal is transmitted by the network device, forwarded by the auxiliary device, and received by the terminal device. In this embodiment of this application, the auxiliary device may be specifically an intelligent surface, or another device that may implement frequency coherent forwarding.

In the step, the reference signal is a signal used for performing beam training. Specifically, the reference signal is a signal used for determining a beam direction and a beam phase of the auxiliary device, or the reference signal includes a first reference signal used for determining a beam direction of the auxiliary device and a second reference signal used for determining a beam phase of the auxiliary device.

The measurement information may include at least one of the following:
  a signal strength of the reference signal;
  a number of an optimal beam direction or a slot index of a corresponding reference signal or other information that may uniquely determine a beam direction; or
  a number of an optimal beam phase or a slot index of a corresponding reference signal or other information that may uniquely determine a beam phase.

Step 202. Report the measurement information to a network device.

The measurement information is reported to the network device, such as a base station, so that the network device may determine an optimal beam direction and an optimal beam phase of a forwarding beam of the auxiliary device. Further, based on the optimal beam direction and the optimal beam phase, the influence of frequency selective fading caused by a multipath environment may be reduced.

In the beam training method of this embodiment of this application, at least two reference signals used for beam training and forwarded by an auxiliary device are measured in at least two forwarding modes to obtain measurement information; and the measurement information is reported to the network device, so that the network device may determine an optimal beam direction and an optimal beam phase of the forwarded signal of the auxiliary device. Further, based on the optimal beam direction and the beam phase, the influence of frequency selective fading caused by the multipath environment may be reduced.

As a first optional implementation, the reference signal includes a first reference signal and a second reference signal;

the first reference signal is a reference signal transmitted by the network device and used for determining a beam direction of the auxiliary device; and the second reference signal is a reference signal transmitted by the network device and used for determining a beam phase of the auxiliary device.

Based on this, before the measuring at least two reference signals used for beam training and forwarded by an auxiliary device in at least two forwarding modes, the method further includes:

receiving first indication information and second indication information transmitted by the network device, where the first indication information is time-frequency resource configuration information of the first reference signal, the first indication information corresponds to at least N transmission occasions, and N is less than or equal to a quantity of beam directions of the forwarded signal of the auxiliary device; and the second indication information is time-frequency resource configuration information of the second reference signal, the second indication information corresponds to at least M transmission occasions, and M is less than or equal to a quantity of beam phases of the forwarded signal of the auxiliary device, where N and M are positive integers. It may be understood that, the beam direction of the forwarded signal of the auxiliary device corresponding to N transmission occasions of the first reference signal is a subset of an actual maximum quantity of beam directions of the forwarded signal of the auxiliary device; and the beam phase of the forwarded signal of the auxiliary device corresponding to M transmission occasions of the second reference signal is a subset of an actual maximum quantity of beam phases of the forwarded signal of the auxiliary device.

Optionally, a bandwidth of the first reference signal is greater than or equal to a preset bandwidth threshold.

In this embodiment of this application, the first reference signal is a broadband signal. For example, a bandwidth of the first reference signal may be a full bandwidth or greater than a preset bandwidth threshold to ensure that a multipath resolution is large enough and the accuracy of beam training is not affected by multipath frequency selective fading and the beam phase as much as possible.

Optionally, a first frequency range corresponding to the second reference signal is greater than or equal to a second frequency range, and the second frequency range is a frequency range corresponding to data transmission between the terminal device and the network device.

In this embodiment of this application, the second reference signal may be a narrowband signal. A range of frequency resources of the second reference signal is the same as a range of frequency resources used for data transmission (for example, frequency resources configured for semi-persistent scheduling transmission), or includes the range of frequency resources used for data transmission.

In the first optional implementation, the measuring at least two reference signals used for beam training and forwarded by an auxiliary device in at least two forwarding modes to obtain measurement information includes:

measuring the first reference signal to obtain first measurement information, where the first measurement information is used for indicating an optimal beam direction of the forwarded signal of the auxiliary device in a bandwidth of the first reference signal; and measuring the second reference signal to obtain second measurement information, where the second measurement information is used for indicating an optimal beam phase corresponding to the optimal beam direction of the forwarded signal of the auxiliary device in a bandwidth of the second reference signal.

In the first optional implementation, the optimal beam direction and the optimal beam phase of the auxiliary device are determined through two-stage beam training. In a first stage, the network device transmits a plurality of signals (broadband signals are recommended), and the auxiliary device uses different forwarding beams (that is, requires different beam directions and does not limit the beam phase) to forward to the terminal device. The terminal device performs measurement for the network device to determine the optimal beam direction. In a second stage, the network device transmits a plurality of signals (narrowband signals are recommended, corresponding to or including frequency resources for data transmission), and the auxiliary device uses the optimal beam direction in the first stage and forwards to the terminal device by using different forwarding beam phases. The terminal device performs measurement, so that the network device determines the optimal beam phase corresponding to the optimal beam direction.

Optionally, the beam training in the two stages may be performed periodically or dynamically triggered aperiodically.

Optionally, a periodicity of the beam phase training and a periodicity of the beam direction training may be different, and the periodicity of the beam phase training is less than or equal to the periodicity of the beam direction training.

Optionally, in a case that the received strength of the second reference signal is less than a first strength threshold, first application information is reported. The first application information is information used for applying for ending the beam phase training, or information used for applying for the beam direction training.

Optionally, in a case that a strength of each of the second reference signals is less than a second strength threshold, or in a case that a strength of a signal of data transmission between the terminal device and the network device is less than a second strength threshold, second application information is reported. The second application information is information used for applying for the beam direction training.

In the implementation, the network device transmits the first reference signal a plurality of times with the same transmission beam, and the intelligent surface forwards the first reference signal to the terminal device by using different forwarding modes. The terminal device receives the first reference signal forwarded by the intelligent surface a plurality of times by using the same beam, measures the first reference signal to obtain the strength of each of the first reference signal, and reports the strength of each of the first reference signal and/or a number of the optimal beam direction to the network device as the first measurement information. The optimal beam direction refers to a beam direction corresponding to the first reference signal with the strongest signal strength; and next, the network device configures the optimal beam direction to the intelligent surface, and the intelligent surface forwards the second reference signal transmitted a plurality of times by the network device by using the optimal beam direction, measures the second reference signal to obtain the strength of each of the second reference signal, and reports the strength of each of the second reference signal and/or a number of the optimal forwarding phase to the network device as the second measurement information. The optimal forwarding phase refers to a forwarding phase corresponding to the second reference signal with the strongest signal strength.

As a second optional implementation, the reference signal used for beam training is a third reference signal;
the third reference signal is a reference signal transmitted by the network device and used for determining a beam direction and a beam phase of the auxiliary device, and a quantity of transmission occasions of the third reference signal is M*N, where
N is a quantity of beam directions of the forwarded signal of the auxiliary device and configured by the network device, and M is a quantity of beam phases of each forwarding beam and configured by the network device, each transmission occasion of the third reference signal corresponds to one beam direction and one beam phase of the auxiliary device, and different beam training signals correspond to different forwarding beams and/or beam phases.

Based on this, before the measuring at least two reference signals used for beam training and forwarded by an auxiliary device in at least two forwarding modes, the method further includes:
receiving third indication information transmitted by the network device, where
the third indication information is time-frequency resource configuration information of the third reference signal, the third indication information corresponds to at least M*N transmission occasions, N is less than or equal to a quantity of beam directions of the forwarded signal of the auxiliary device, and M is less than or equal to a quantity of beam phases of the forwarded signal of the auxiliary device.

Optionally, the measuring at least two reference signals used for beam training and forwarded by an auxiliary device in at least two forwarding modes includes:
measuring the third reference signal to obtain third measurement information, where the third measurement information is information used for indicating an optimal combination of a beam direction and a beam phase of a forwarded signal of the auxiliary device and a sub-band in a bandwidth of the third reference signal; and/or
measuring the third reference signal to obtain fourth measurement information, where the fourth measurement information is information used for indicating optimal sub-bands corresponding to M beam phases corresponding to an optimal beam direction of the forwarded signal of the auxiliary device in a bandwidth of the third reference signal.

In the implementation, the network device may configure M*N third reference signals, which respectively correspond to M*N forwarding modes of the auxiliary device (each forwarding mode includes a beam direction and a beam phase), and notify the terminal device of configuration information of the M*N third reference signals.

Assuming that K sub-bands are included, M*N*K sub-bands included in the third reference signal are measured. Each measurement result corresponds to a combination of a beam direction and a beam phase, and a sub-band, and the beam direction and beam phase corresponding to a measurement result with the strongest signal strength and the sub-band are selected as an optimal combination.

In the second optional implementation, one-stage beam training is used for obtaining information about an optimal combination of a beam direction and a beam phase of a forwarded signal of the auxiliary device and a sub-band, and information about optimal sub-bands corresponding to M beam phases corresponding to an optimal beam direction of the forwarded signal of the auxiliary device in a bandwidth of the third reference signal.

Optionally, the measuring at least two reference signals used for beam training and forwarded by an auxiliary device in at least two forwarding modes includes:

for a semi-persistent scheduling service, measuring the reference signal according to a beam training periodicity or after receiving a beam training indication to obtain measurement information, where the reference signal includes a first reference signal and a second reference signal, or the reference signal includes a second reference signal;

the measurement information includes first measurement information and second measurement information in a case that the reference signal includes the first reference signal and the second reference signal; and the measurement information includes the second measurement information in a case that the reference signal includes the second reference signal.

Optionally, before the semi-persistent scheduling service is activated, or when the semi-persistent scheduling service is activated, the first reference signal and/or the second reference signal forwarded by the auxiliary device in at least two forwarding modes is measured.

Optionally, in the beam training method in this embodiment of this application, the measuring at least two reference signals used for beam training and forwarded by an auxiliary device in at least two forwarding modes includes:

for a dynamic scheduling service, measuring the reference signal according to a beam training periodicity or after receiving a beam training indication to obtain measurement information, where the reference signal includes a first reference signal and a second reference signal, or the reference signal includes a third reference signal;

the measurement information includes first measurement information and second measurement information in a case that the reference signal includes the first reference signal and the second reference signal; and the measurement information includes third measurement information and/or fourth measurement information in a case that the reference signal is the third reference signal.

Optionally, the beam training method in this embodiment of this application further includes:

measuring channel state information (CSI) of each sub-band at different transmission occasions of the second reference signal or the third reference signal; and reporting the CSI of the sub-band at different transmission occasions of the second reference signal or the third reference signal to the network device, where different transmission occasions of the second reference signal or the third reference signal correspond to different forwarding modes of the auxiliary device.

Further, optionally, the reporting the CSI of the sub-band at different transmission occasions of the second reference signal or the third reference signal to the network device includes:

reporting CSI of an optimal sub-band at each transmission occasion of the second reference signal; or reporting CSI of an optimal sub-band at each transmission occasion of the third reference signal.

Further, optionally, the reporting the CSI of the sub-band at different transmission occasions of the second reference signal or the third reference signal to the network device includes:

determining CSI of an optimal sub-band combination and reporting the CSI of an optimal sub-band combination to the network device according to sub-band CSI of M transmission occasions, where the sub-band combination includes M frequency hopping sub-bands paired according to a frequency hopping rule, and the M frequency hopping sub-bands correspond to M transmission occasions of the second reference signal, or the M frequency hopping sub-bands correspond to M transmission occasions of the third reference signal.

Optionally, the CSI includes a target indication message, where the target indication message is used for indicating a beam phase corresponding to the CSI.

For example, a reference signal or a slot index or other information is added to the CSI to indicate the beam phase corresponding to the CSI.

In this embodiment of this application, the CSI of the sub-band is measured, to ensure that an optimal communication manner is used for the dynamic scheduling service.

The beam training method of this application is described below with reference to specific embodiments.

Embodiment 1: For semi-persistent scheduling (SPS), the base station configures time-frequency resources that is periodically effective for the terminal. The terminal transmits a physical downlink shared channel (PDSCH) or a physical uplink shared channel (PUSCH) on a fixed slot and fixed time-frequency resources. For such terminal services with relatively fixed time-frequency resources or relatively inflexible and infrequent scheduling, the following beam training process is used.

1. The base station notifies the terminal of a periodicity of the beam direction training of the intelligent surface, or transmits a message to trigger an aperiodic beam direction training process.

The base station determines a quantity of candidate beams of the intelligent surface. Optionally, a quantity of supportable beams that is reported by the intelligent surface is used. Optionally, according to the actual communication condition, the base station selects several beams from configurable beams of the intelligent surface and notifies the intelligent surface.

The base station configures parameters (such as time-frequency resources, reference signal sequence generation parameters, ports, or the like) of a corresponding reference signal (first reference signal) according to the quantity of candidate beams of the intelligent surface, and the reference signal should be time-division multiplexed. Optionally, the base station notifies the terminal of the quantity of candidate beams of the intelligent surface and/or configuration parameters of the corresponding reference signal. Optionally, a bandwidth of the reference signal may be a full bandwidth or greater than a specific bandwidth threshold to ensure that a multipath resolution is large enough and the accuracy of beam training is not affected by multipath frequency selective fading and the beam phase as much as possible.

2. The terminal receives the reference signal according to the configuration information of the base station, measures the signal strength, and feeds back the measurement result or the number of the optimal beam direction.

The base station determines the optimal beam direction of the intelligent surface according to a reporting message of the terminal, and configures the optimal beam direction for the intelligent surface.

3. The base station configures the terminal and the intelligent surface for beam phase training. The beam phase training may be periodic, or a message-triggered aperiodic beam phase training process.

The quantity of candidate beam phases of the intelligent surface is notified, or the quantity of beam phases and configuration parameters of the corresponding reference signal (same as above) is determined by using the capability of the intelligent surface (for example, the intelligent surface intelligently supports phase adjustment of 0 or $\pi$ controlled by 1 bit, two phase states).

A range of frequency resources of the reference signal (second reference signal) for beam phase training is the same as a range of frequency resources used for data transmission (for example, frequency resources configured for SPS transmission), or includes the range of the frequency resources.

The base station transmits the reference signal with the same transmission beam, and the intelligent surface forwards the reference signal with different phases at different moments according to a beam direction specified by the base station.

4. The terminal receives the reference signal according to information of the base station, measures each signal strength, and feeds back the measurement result or a beam number corresponding to the optimal beam phase.
5. The base station notifies the intelligent surface to adjust the beam phase according to the measurement result reported by the terminal.

Embodiment 2: For a dynamic scheduling terminal service, the terminal needs to measure sub-band CSI with different phases of the same intelligent surface beam to determine an optimal communication manner. The beam training process of the intelligent surface is as follows:

1. The base station performs beam direction training on the intelligent surface.

The terminal selects the optimal beam direction through the strength of the reference signal RSRP, and reports to the base station. A specific process is the same as the embodiment 1.

2. The base station performs beam phase training on the intelligent surface.

The base station transmits the reference signal in the full bandwidth (transmitting once or transmitting according to sub-band time-division), and correspondingly configures the quantity of reference signals according to the quantity of to-be-measured beam phases of the intelligent surface. The configuration and implementation are the same as the embodiment 1.

3. The terminal receives the reference signal and measures and reports the sub-band CSI.

Optionally, the terminal respectively reports the optimal sub-band CSI according to the quantity of beam phases of the intelligent surface, that is, for each beam phase, respectively reports the optimal sub-band CSI under the beam phase.

Optionally, according to a rule of frequency hopping (a pairing manner of frequency hopping sub-bands, that is, performing frequency hopping between a sub-band 1 and a sub-band 2), the terminal measures CSI of a sub-band 1 of a beam phase 1 of the intelligent surface and CSI of a sub-band 2 of a beam phase 2 of the intelligent surface, and reports an optimal frequency hopping sub-band.

Further, optionally, after the CSI of the sub-band 1 and the CSI of the sub-band 2 are weighted, a piece of sub-band CSI may be obtained and reported.

4. The base station schedules the PDSCH according to a reporting result of the terminal.

Optionally, the base station selects the optimal beam phase, and configures the optimal beam phase to the intelligent surface according to reporting results of a plurality of beam phases; and the base station transmits the PDSCH on the corresponding optimal sub-band.

Optionally, the base station configures a switching time and a switching sequence of the beam phase of the intelligent surface; and the base station schedules the frequency hopping PDSCH for the terminal according to the switching time and the switching sequence. The frequency hopping sub-band is determined by using information reported by the terminal.

For example, the beam phase of the intelligent surface is switched from a phase 1 to a phase 2 at a first time. At the phase 1, an optimal sub-band is a first sub-band, and at the phase 2, an optimal sub-band is a second sub-band. The PDSCH is transmitted on the first sub-band before the first time, and the PDSCH is transmitted on the second sub-band after the first time.

Embodiment 3: For a dynamic scheduling communication service, a one-stage process is used for completing measurement scheduling.

Assuming that the quantity of beam directions of the intelligent surface is N, the quantity of phases of each beam direction is M.

1. The base station determines the beam direction and quantity of beams of the intelligent surface.
2. The base station configures the beam direction and beam phase for all intelligent surfaces.

Specifically, the base station configures M*N reference signals, which respectively correspond to M*N forwarding modes of the intelligent surface. The base station notifies the terminal of the configuration parameters of the reference signals, and indicates which beam of the intelligent surface each reference signal corresponds to.

3. The terminal receives the reference signal, and performs sub-band CSI measurement and reporting.

A measurement and reporting method is the same as the embodiment 2.

According to the M*N reference signals, the optimal sub-band and the corresponding optimal beam direction and beam phase are selected, or according to the M*N reference signals, a plurality of optimal sub-bands used for frequency hopping and corresponding optimal beam directions and optimal beam phases are selected, or a plurality of optimal sub-bands used for frequency hopping and corresponding beam phases in M beam phases in a beam direction are selected.

4. The base station configures the intelligent surface according to the reporting result of the terminal and schedules the PDSCH of the terminal.

In the beam training method of this embodiment of this application, at least two reference signals used for beam training and forwarded by an auxiliary device are measured in at least two forwarding modes to obtain measurement information; and the measurement information is reported to the network device, so that the network device may determine an optimal beam direction and an optimal beam phase of the forwarded signal of the auxiliary device. Further, based on the optimal beam direction and the beam phase, the influence of frequency selective fading caused by the multipath environment may be reduced.

Figure 3:
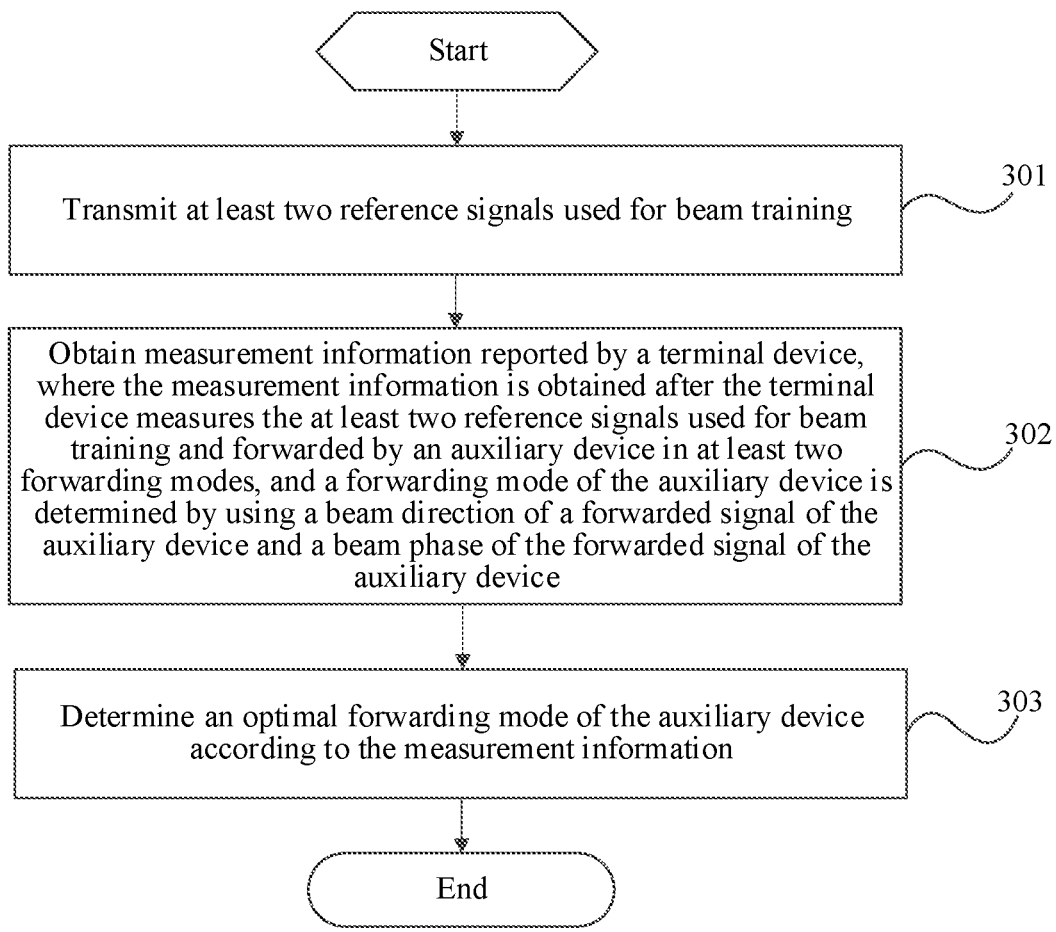
FIG. 3 is a schematic flowchart 2 of a beam training method according to an embodiment of this application.

As shown in FIG. 3, this embodiment of this application further provides a beam training method, applied to a network-side device, and the method including:

Step 301. Transmit at least two reference signals used for beam training.

In the step, the reference signal is a signal used for performing beam training. Specifically, the reference signal is a signal used for determining a beam direction and a beam phase of the auxiliary device, or the reference signal includes a first reference signal used for determining a beam direction of the auxiliary device and a second reference signal used for determining a beam phase of the auxiliary device.

Step 302. Obtain measurement information reported by a terminal device, where the measurement information is obtained after the terminal device measures the at least two reference signals used for beam training and forwarded by an auxiliary device in at least two forwarding modes, and a forwarding mode of the auxiliary device is determined by using a beam direction of a forwarded signal of the auxiliary device and a beam phase of the forwarded signal of the auxiliary device.

The measurement information may include at least one of the following:

a signal strength of the reference signal;
a number of an optimal beam direction; or
a number of an optimal beam phase.

Step 303. Determine an optimal forwarding mode of the auxiliary device according to the measurement information.

According to the measurement information, the network device may determine the optimal beam direction and the optimal beam phase of the forwarding beam of the auxiliary device, that is, obtain the optimal forwarding mode of the auxiliary device, so that the influence of frequency selective fading may be improved by controlling the multipath phase.

In the beam training method of this embodiment of this application, at least two reference signals used for beam training are transmitted; measurement information reported by a terminal device is obtained; and according to the measurement information, the optimal forwarding mode of the auxiliary device is determined, that is, the optimal beam direction and the optimal beam phase of the auxiliary device are determined, so that the influence of frequency selective fading may be improved by controlling the multipath phase.

As a first optional implementation, the reference signal includes a first reference signal and a second reference signal;

the first reference signal is a reference signal used for determining a beam direction of the auxiliary device; and the second reference signal is a reference signal used for determining a beam phase of the auxiliary device.

Based on this, before the obtaining measurement information reported by a terminal device, the method further includes:

transmitting first indication information and second indication information to the terminal device:

the first indication information is time-frequency resource configuration information of the first reference signal, the first indication information corresponds to at least N transmission occasions, and N is less than or equal to a quantity of beam directions of the forwarded signal of the auxiliary device; and the second indication information is time-frequency resource configuration information of the second reference signal, the second indication information corresponds to at least M transmission occasions, and M is less than or equal to a quantity of beam phases of the forwarded signal of the auxiliary device.

Optionally, before the obtaining measurement information reported by a terminal device, the method further includes:

transmitting first configuration information and second configuration information to the auxiliary device, where the first configuration information is time domain configuration information of beam directions of N forwarded signals of the auxiliary device, and the time domain configuration information is in one-to-one correspondence with N transmission occasions of the first reference signal; and the second configuration information is time domain configuration information of M beam phases corresponding to an optimal beam direction of the auxiliary device, the time domain configuration information is in one-to-one correspondence with M transmission occasions of the second reference signal, and the optimal beam direction is determined by using the first reference signal.

Optionally, the measurement information includes first measurement information and second measurement information;

the first measurement information is used for indicating an optimal beam direction of the forwarded signal of the auxiliary device in a bandwidth of the first reference signal; and the second measurement information is used for indicating an optimal beam phase corresponding to the optimal beam direction of the forwarded signal of the auxiliary device in a bandwidth of the second reference signal.

As a second optional implementation, the reference signal used for beam training is a third reference signal;

the third reference signal is a reference signal used for determining a beam direction and a beam phase of the auxiliary device, and a quantity of transmission occasions of the third reference signal is M*N, where N is a quantity of beam directions of the forwarded signal of the auxiliary device and configured by the network device, and M is a quantity of beam phases of each forwarding beam and configured by the network device, each transmission occasion of the third reference signal corresponds to one beam direction and one beam phase of the auxiliary device, and different beam training signals correspond to different forwarding beams and/or beam phases.

Optionally, before the obtaining measurement information reported by a terminal device, the method further includes:

transmitting third indication information to the terminal device, where the third indication information is time-frequency resource configuration information of the third reference signal, the third indication information corresponds to at least M*N transmission occasions, N is less than or equal to a quantity of beam directions of the forwarded signal of the auxiliary device, and M is less than or equal to a quantity of beam phases of the forwarded signal of the auxiliary device.

Optionally, the beam training method in this embodiment of this application further includes:

transmitting third configuration information to the auxiliary device, where the third configuration information is time domain configuration information of beam directions and beam phases of M*N forwarded signals of the auxiliary device, and the time domain configuration information is in one-to-one correspondence with M*N transmission occasions of the third reference signal.

Optionally, the measurement information includes third measurement information and/or fourth measurement information, where the third measurement information is information used for indicating an optimal combination of a beam direction and a beam phase of a forwarded signal of the auxiliary device and a sub-band in a bandwidth of the third reference signal; and the fourth measurement information is information used for indicating optimal sub-bands corresponding to M beam phases corresponding to an optimal beam direction of the forwarded signal of the auxiliary device in a bandwidth of the third reference signal.

Optionally, in this embodiment of this application, for a semi-persistent scheduling service, the reference signal includes a first reference signal and a second reference signal, or the reference signal includes a second reference signal;

the measurement information includes first measurement information and second measurement information in a case that the reference signal includes the first reference signal and the second reference signal; and the measurement information includes the second measurement information in a case that the reference signal includes the second reference signal.

Optionally, in this embodiment of this application, for a dynamic scheduling service, the reference signal includes a first reference signal and a second reference signal; or the reference signal includes a third reference signal;

the measurement information includes first measurement information and second measurement information in a case that the reference signal includes the first reference signal and the second reference signal; and the measurement information includes third measurement information and/or fourth measurement information in a case that the reference signal is the third reference signal;

the third measurement information is information used for indicating an optimal combination of a beam direction and a beam phase of a forwarded signal of the auxiliary device and a sub-band in a bandwidth of the third reference signal; and the fourth measurement information is information used for indicating optimal sub-bands corresponding to M beam phases corresponding to an optimal beam direction of the forwarded signal of the auxiliary device in a bandwidth of the third reference signal.

Further, optionally, the beam training method in this embodiment of this application further includes:

receiving sub-band CSI information reported by the terminal device, where the sub-band CSI information corresponds to measurement information of sub-band CSI at different transmission occasions of the second reference signal or the third reference signal.

Optionally, the sub-band CSI information includes CSI of an optimal sub-band at each transmission occasion of the second reference signal; or the sub-band CSI information includes CSI of an optimal sub-band at each transmission occasion of the third reference signal; or the sub-band CSI information is CSI of an optimal sub-band combination, where the sub-band combination includes M frequency hopping sub-bands paired according to a frequency hopping rule, and the M frequency hopping sub-bands correspond to M transmission occasions of the second reference signal, or the M frequency hopping sub-bands correspond to M transmission occasions of the third reference signal.

Optionally, after the determining an optimal forwarding mode of the auxiliary device according to the measurement information, the method further includes:

scheduling data transmission by using an optimal combination of a sub-band and the optimal forwarding mode.

Optionally, the scheduling data transmission by using an optimal combination of a sub-band and the optimal forwarding mode includes:

performing data transmission on an optimal sub-band, where the optimal sub-band is a sub-band in the optimal combination; or sequentially performing data transmission on M frequency hopping sub-bands of the sub-band combination in a frequency hopping manner.

Optionally, before the scheduling data transmission by using an optimal combination of a sub-band and the optimal forwarding mode, the method further includes:

transmitting fourth configuration information to the auxiliary device, where the fourth configuration information indicates the optimal forwarding mode of the auxiliary device corresponding to an optimal sub-band used for data transmission; or transmitting fifth configuration information to the auxiliary device, where the fifth configuration information indicates forwarding modes of M auxiliary devices corresponding to M sub-bands used for data transmission.

Optionally, the beam training method in this embodiment of this application further includes:

controlling a beam phase of the auxiliary device in at least one of the following manners;

performing offset processing on array information of a forwarding beam of the auxiliary device; or calculating array information of a forwarding beam of the auxiliary device according to different discretization indicators.

In this embodiment of this application, a principle of beam forming of the intelligent surface is implemented by a phase difference of an emitting signal of each intelligent surface device. Provided that a phase difference between the devices remains unchanged, a state of the array may be changed as a whole, and the beam phase may be controlled.

For example, as shown in FIG. 1, an intelligent surface is a device controlled by 1 bit, and implements a phase inversion of 0 or $\pi$. Array information of the current beam is A=(1000, 0100, 0001, 1010), the array information is increased by an offset of 1 as a whole, and $\overline{A}=A\oplus1$=(0111, 1011, 1110, 0101). In this case, the emitting beam direction remains unchanged, but a beam phase is flipped by $\pi$.

The control of the beam phase may further be implemented by the discretization indicator of the phase of the emitting signal of the device.

For example, ranges in the following formula $\Delta\phi_{mn}$ are (0, $\pi$) and ($\pi$, $2\pi$), then, $\frac{\pi}{2}$ and $\frac{3\pi}{2}$.

beam phases of the expected emitting signal should be superimposed as That is, an intermediate value of $(0, \pi)$ and $(\pi, 2\pi)$ are respectively taken.

$$\Delta\phi'_{mn} = \begin{cases} +\pi/2 & 0 \le \Delta\phi_{mn} \bmod 2\pi < \pi \\ -\pi/2 & \pi \le \Delta\phi_{mn} \bmod 2\pi < 2\pi \end{cases},$$

where
in another example, a range of $\Delta\phi_{mn}$ in the formula is $$\left(-\frac{\pi}{2}, \frac{\pi}{2}\right) \text{ and } \left(\frac{\pi}{2}, \frac{3\pi}{2}\right),$$

and then, the beam phase of the expected emitting signal should be superimposed as 0 and $\pi$.

$$\Delta\phi'_{mn} = \begin{cases} +\pi/2 & -\pi/2 \le \Delta\phi_{mn} \bmod 2\pi < \pi/2 \\ -\pi/2 & \pi/2 \le \Delta\phi_{mn} \bmod 2\pi < 3\pi/2 \end{cases}.$$

Intelligent devices implement different beam phases according to different discretization indicators. By combining the two discretization indicators, the quantity of emitting beam phases of the intelligent surface may be greater than the quantity of device states of the intelligent device.

In the beam training method of this embodiment of this application, at least two reference signals used for beam training are transmitted; measurement information reported by a terminal device is obtained; and according to the measurement information, the optimal forwarding mode of the auxiliary device is determined, that is, the optimal beam direction and the optimal beam phase of the auxiliary device are determined, so that the influence of frequency selective fading may be improved by controlling the multipath phase.

It is to be noted that, the beam training method describes the downlink related process. Certainly, this embodiment of this application may also be implemented by the uplink beam training process. That is, the terminal device transmits at least two reference signals for beam training, or a part of the reference signal is transmitted by the network device, and the other part is transmitted by the terminal device; the network device measures at least two reference signals used for beam training and forwarded by an auxiliary device in at least two forwarding modes to obtain measurement information and transmit to the terminal device; and the terminal device determines an optimal forwarding mode of the auxiliary device according to the measurement information.

It is to be noted that, in the beam training method provided in this embodiment of this application, the execution entity may be a beam training apparatus, or a control module configured to perform the beam training method in the beam training apparatus. In this embodiment of this application, the beam training apparatus performing the beam training method is used as an example to describe the beam training apparatus provided in this application.

Figure 4:
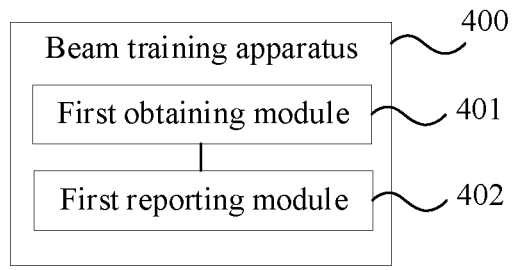
FIG. 4 is a schematic diagram 1 of a module of a beam training apparatus according to an embodiment of this application.

As shown in FIG. 4, this embodiment of this application provides a beam training apparatus 400, applied to a terminal device, and the apparatus including:
a first obtaining module 401, configured to measure at least two reference signals used for beam training and forwarded by an auxiliary device in at least two forwarding modes to obtain measurement information, where the measurement information is used for indicating an optimal forwarding mode of the auxiliary device, and a forwarding mode of the auxiliary device is determined by using a beam direction of a forwarded signal of the auxiliary device and a beam phase of the forwarded signal of the auxiliary device; and
a first reporting module 402, configured to report the measurement information to a network device.

In the beam training apparatus of this embodiment of this application, at least two reference signals used for beam training and forwarded by an auxiliary device are measured in at least two forwarding modes to obtain measurement information; and the measurement information is reported to the network device, so that the network device may determine an optimal beam direction and an optimal beam phase of the forwarded signal of the auxiliary device. Further, based on the optimal beam direction and the beam phase, the influence of frequency selective fading caused by the multipath environment may be reduced.

In the beam training apparatus of this embodiment of this application, the reference signal includes a first reference signal and a second reference signal;
the first reference signal is a reference signal transmitted by the network device and used for determining a beam direction of the auxiliary device; and
the second reference signal is a reference signal transmitted by the network device and used for determining a beam phase of the auxiliary device.

The beam training apparatus of this embodiment of this application further includes:
a first receiving module, configured to receive the first indication information and the second indication information transmitted by the network device before the first obtaining module measures at least two reference signals for beam training forwarded by the auxiliary device in the at least two forwarding modes; and
the first indication information is time-frequency resource configuration information of the first reference signal, the first indication information corresponds to at least N transmission occasions, and N is less than or equal to a quantity of beam directions of the forwarded signal of the auxiliary device; and
the second indication information is time-frequency resource configuration information of the second reference signal, the second indication information corresponds to at least M transmission occasions, and M is less than or equal to a quantity of beam phases of the forwarded signal of the auxiliary device.

In the beam training apparatus of this embodiment of this application, a bandwidth of the first reference signal is greater than or equal to a preset bandwidth threshold.

In the beam training apparatus of this embodiment of this application, a first frequency range corresponding to the second reference signal is greater than or equal to a second frequency range, and the second frequency range is a frequency range corresponding to data transmission between the terminal device and the network device.

In the beam training apparatus of this embodiment of this application, the first obtaining module includes:
a first obtaining submodule, configured to measure the first reference signal to obtain first measurement information, where the first measurement information is used for indicating an optimal beam direction of the forwarded signal of the auxiliary device in a bandwidth of the first reference signal; and a second obtaining submodule, configured to measure the second reference signal to obtain second measurement information, where the second measurement information is used for indicating an optimal beam phase corresponding to the optimal beam direction of the forwarded signal of the auxiliary device in a bandwidth of the second reference signal.

In the beam training apparatus of this embodiment of this application, the reference signal used for beam training is a third reference signal;

the third reference signal is a reference signal transmitted by the network device and used for determining a beam direction and a beam phase of the auxiliary device, and a quantity of transmission occasions of the third reference signal is M*N, where N is a quantity of beam directions of the forwarded signal of the auxiliary device and configured by the network device, and M is a quantity of beam phases of each forwarding beam and configured by the network device, each transmission occasion of the third reference signal corresponds to one beam direction and one beam phase of the auxiliary device, and different beam training signals correspond to different forwarding beams and/or beam phases.

The beam training apparatus of this embodiment of this application further includes:

a second receiving module, configured to receive the third indication information transmitted by the network device before the first obtaining module measures the at least two reference signals used for beam training forwarded by the auxiliary device in the at least two forwarding modes; and the third indication information is time-frequency resource configuration information of the third reference signal, the third indication information corresponds to at least M*N transmission occasions, N is less than or equal to a quantity of beam directions of the forwarded signal of the auxiliary device, and M is less than or equal to a quantity of beam phases of the forwarded signal of the auxiliary device.

In the beam training apparatus of this embodiment of this application, the first obtaining module is configured to measure the third reference signal to obtain third measurement information, where the third measurement information is information used for indicating an optimal combination of a beam direction and a beam phase of a forwarded signal of the auxiliary device and a sub-band in a bandwidth of the third reference signal; and/or measure the third reference signal to obtain fourth measurement information, where the fourth measurement information is information used for indicating optimal sub-bands corresponding to M beam phases corresponding to an optimal beam direction of the forwarded signal of the auxiliary device in a bandwidth of the third reference signal.

In the beam training apparatus of this embodiment of this application, the first obtaining module is configured to measure, for a semi-persistent scheduling service, the reference signal according to a beam training periodicity or after receiving a beam training indication to obtain measurement information, where the reference signal includes a first reference signal and a second reference signal, or the reference signal includes a second reference signal;

the measurement information includes first measurement information and second measurement information in a case that the reference signal includes the first reference signal and the second reference signal; and the measurement information includes the second measurement information in a case that the reference signal includes the second reference signal.

In the beam training apparatus of this embodiment of this application, the first obtaining module is configured to measure, for a dynamic scheduling service, the reference signal according to a beam training periodicity or after receiving a beam training indication to obtain measurement information, where the reference signal includes a first reference signal and a second reference signal, or the reference signal includes a third reference signal;

the measurement information includes first measurement information and second measurement information in a case that the reference signal includes the first reference signal and the second reference signal; and the measurement information includes third measurement information and/or fourth measurement information in a case that the reference signal is the third reference signal.

The beam training apparatus of this embodiment of this application further includes:

a measurement module, configured to measure channel state information CSI of each sub-band at different transmission occasions of the second reference signal or the third reference signal; and a second reporting module, configured to report the CSI of the sub-band at different transmission occasions of the second reference signal or the third reference signal to the network device, where different transmission occasions of the second reference signal or the third reference signal correspond to different forwarding modes of the auxiliary device.

In the beam training apparatus of this embodiment of this application, the second reporting module is configured to report CSI of an optimal sub-band at each transmission occasion of the second reference signal; or report CSI of an optimal sub-band at each transmission occasion of the third reference signal.

In the beam training apparatus of this embodiment of this application, the second reporting module is configured to determine CSI of an optimal sub-band combination and report the CSI of an optimal sub-band combination to the network device according to sub-band CSI of M transmission occasions, where the sub-band combination includes M frequency hopping sub-bands paired according to a frequency hopping rule, and the M frequency hopping sub-bands correspond to M transmission occasions of the second reference signal, or the M frequency hopping sub-bands correspond to M transmission occasions of the third reference signal.

In the beam training apparatus of this embodiment of this application, at least two reference signals used for beam training and forwarded by an auxiliary device are measured in at least two forwarding modes to obtain measurement information; and the measurement information is reported to the network device, so that the network device may determine an optimal beam direction and an optimal beam phase of the forwarded signal of the auxiliary device. Further, based on the optimal beam direction and the beam phase, the influence of frequency selective fading caused by the multipath environment may be reduced.

The beam training apparatus in this embodiment of this application may be an apparatus, and may also be a component in a terminal, an integrated circuit, or a chip. The apparatus may be a mobile terminal, or may be a non-mobile terminal. For example, the mobile terminal may include, but is not limited to, a type of the terminal 11 listed above, and a non-mobile terminal may be a server, a network attached storage (NAS), a personal computer (PC), a television (TV), a cash machine, a self-service machine, or the like, which is not specifically limited in this embodiment of this application.

The beam training apparatus in this embodiment of this application may be an apparatus having an operating system. The operating system may be an Android (Android) operating system, may be an ios operating system, and may further be another possible operating system, which is not specifically limited in this embodiment of this application.

The beam training apparatus provided in this embodiment of this application may implement various processes of the method embodiment in FIG. 2, and implement the same technical effect, which will not be described in detail herein again to avoid repetition.

Figure 5:
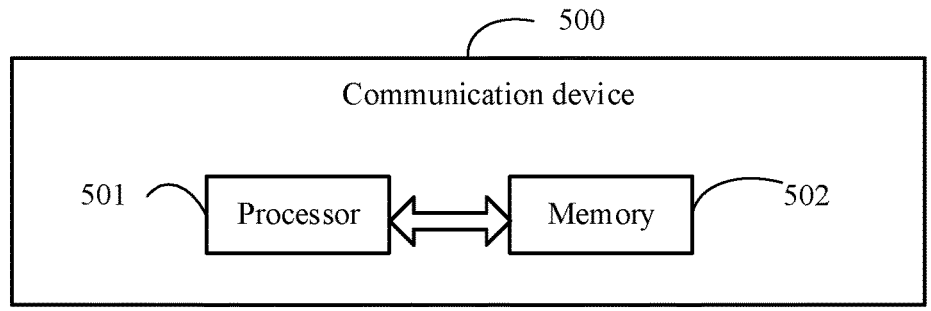
FIG. 5 is a structural block diagram of a communication device according to an embodiment of this application.

Optionally, as shown in FIG. 5, this embodiment of this application further provides a communication device 500, including a processor 501, a memory 502, and a program or instruction stored in the memory 502 and executable on the processor 501. For example, when the communication device 500 is a terminal device, the program or instruction is executed by the processor 501 to implement the various processes of the beam training method embodiment applied to the terminal, and may implement the same technical effect. When the communication device 500 is a network device, the program or the instruction is executed by the processor 501 to implement the various processes applied to the beam training method embodiment on the network device, and may implement the same technical effect, which will not be described in detail herein again to avoid repetition.

Figure 6:
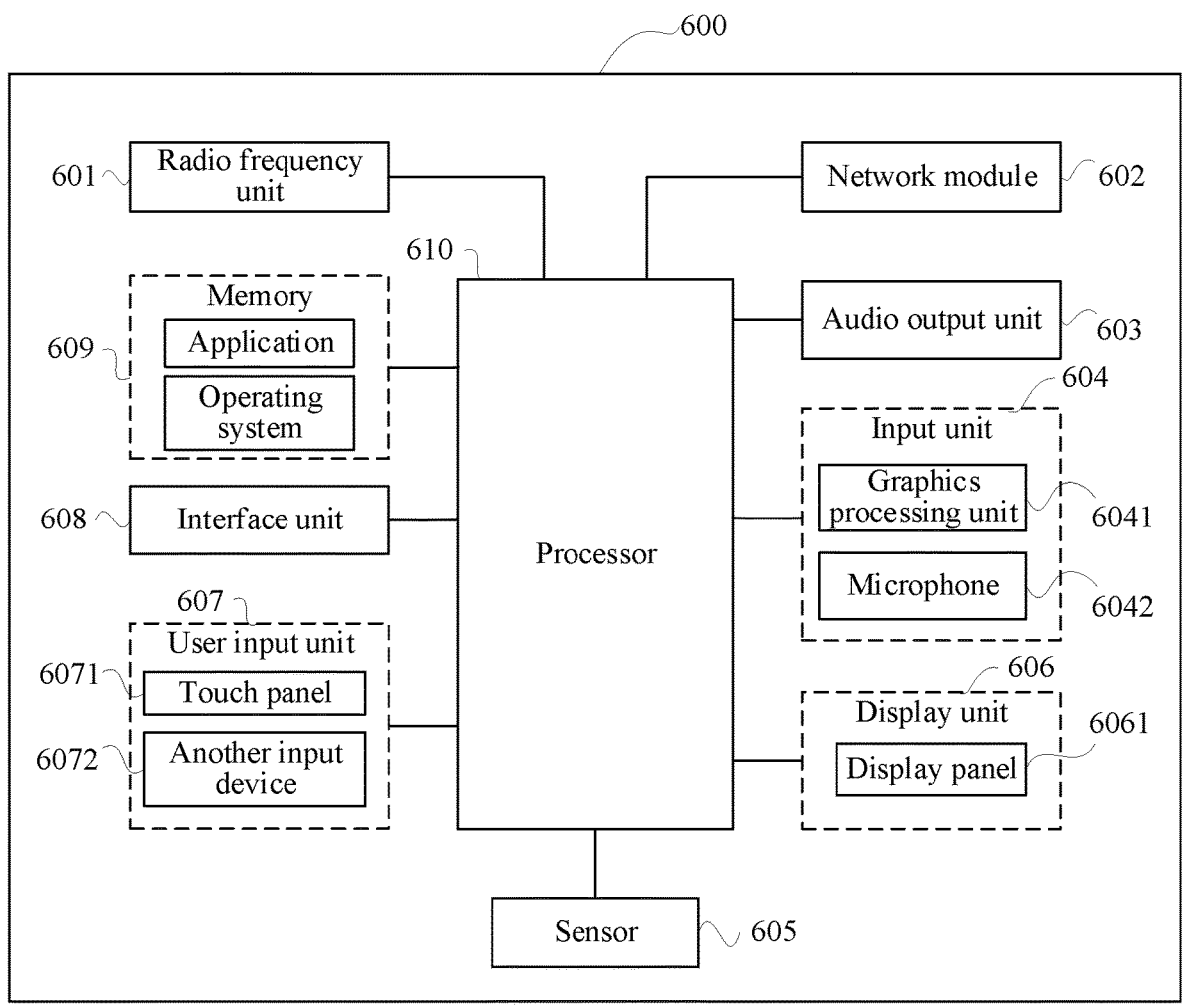
FIG. 6 is a structural block diagram of a terminal device according to an embodiment of this application.

FIG. 6 is a schematic diagram of a hardware structure of a terminal device according to an embodiment of this application.

The terminal device 600 includes, but is not limited to, components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that the terminal device 600 may further include the power supply (such as a battery) for supplying power to the components. The power supply may be logically connected to the processor 610 by a power management system, thereby implementing functions such as charging, discharging, and power consumption management by using the power management system. A terminal structure shown in FIG. 6 does not constitute a limitation to the terminal device, and the terminal device may include more or fewer components than those shown in the figure, or some components may be combined, or a different component deployment may be used, and details are not repeated herein.

It should be understood that, in this embodiment of this application, the input unit 604 may include a graphics processing unit (GPU) 6041 and a microphone 6042. The graphics processing unit 6041 performs processing on image data of a static picture or a video that is obtained by an image acquisition apparatus (for example, a camera) in a video acquisition mode or an image acquisition mode. The display unit 606 may include a display panel 6061, and the display panel 6061 may be configured by using a liquid crystal display, an organic light-emitting diode, or the like. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include, but not limited to, a physical keyboard, a functional key (such as a volume control key or a switch key), a track ball, a mouse, and a joystick, which are not described herein in detail.

In this embodiment of this application, the radio frequency unit 601 receives downlink data from a network-side device and transmits the downlink data to the processor 610 for processing; and sends uplink data to the network-side device. Generally, the radio frequency unit 601 includes, but is not limited to, an antenna, at least one amplifier, a transceiver, a coupler, a low noise amplifier, a duplexer, and the like.

The memory 609 may be configured to store a software program or an instruction and various data. The memory 609 may mainly include a program or instruction storage area and a data storage area. The program or instruction storage area may store an operating system, an application program or instruction required by at least one function (such as a sound playback function and an image display function), and the like. In addition, the memory 609 may include a high-speed random access memory, and may further include non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. Such as at least one magnetic disk storage device, a flash memory device, or other non-volatile solid-state storage devices.

The processor 610 may include one or more processing units; and optionally, the processor 610 may integrate an application processor and a modem processor. The application processor mainly processes an operating system, a user interface, an application program or instruction, and the like. The modem processor mainly processes wireless communication, such as a baseband processor. It may be understood that the foregoing modem may either not be integrated into the processor 610.

The processor 610 is configured to measure at least two reference signals used for beam training and forwarded by an auxiliary device in at least two forwarding modes to obtain measurement information, where the measurement information is used for indicating an optimal forwarding mode of the auxiliary device, and a forwarding mode of the auxiliary device is determined by using a beam direction of a forwarded signal of the auxiliary device and a beam phase of the forwarded signal of the auxiliary device; and the radio frequency unit 601 reports the measurement information to a network device.

In the terminal device of this embodiment of this application, at least two reference signals used for beam training and forwarded by an auxiliary device are measured in at least two forwarding modes to obtain measurement information; and the measurement information is reported to the network device, so that the network device may determine an optimal beam direction and an optimal beam phase of the forwarded signal of the auxiliary device. Further, based on the optimal beam direction and the beam phase, the influence of frequency selective fading caused by the multipath environment may be reduced.

Optionally, the reference signal includes a first reference signal and a second reference signal;

the first reference signal is a reference signal transmitted by the network device and used for determining a beam direction of the auxiliary device; and the second reference signal is a reference signal transmitted by the network device and used for determining a beam phase of the auxiliary device.

Optionally, the processor 610 is further configured to receive first indication information and second indication information transmitted by the network device through a radio frequency unit, where
the first indication information is time-frequency resource configuration information of the first reference signal, the first indication information corresponds to at least N transmission occasions, and N is less than or equal to a quantity of beam directions of the forwarded signal of the auxiliary device; and
the second indication information is time-frequency resource configuration information of the second reference signal, the second indication information corresponds to at least M transmission occasions, and M is less than or equal to a quantity of beam phases of the forwarded signal of the auxiliary device.

Optionally, a bandwidth of the first reference signal is greater than or equal to a preset bandwidth threshold.

Optionally, a first frequency range corresponding to the second reference signal is greater than or equal to a second frequency range, and the second frequency range is a frequency range corresponding to data transmission between the terminal device and the network device.

Optionally, the processor 610 is further configured to measure the first reference signal to obtain first measurement information, where the first measurement information is used for indicating an optimal beam direction of the forwarded signal of the auxiliary device in a bandwidth of the first reference signal; and
measuring the second reference signal to obtain second measurement information, where the second measurement information is used for indicating an optimal beam phase corresponding to the optimal beam direction of the forwarded signal of the auxiliary device in a bandwidth of the second reference signal.

Optionally, the reference signal used for beam training is a third reference signal;
the third reference signal is a reference signal transmitted by the network device and used for determining a beam direction and a beam phase of the auxiliary device, and a quantity of transmission occasions of the third reference signal is M*N, where
N is a quantity of beam directions of the forwarded signal of the auxiliary device and configured by the network device, and M is a quantity of beam phases of each forwarding beam and configured by the network device, each transmission occasion of the third reference signal corresponds to one beam direction and one beam phase of the auxiliary device, and different beam training signals correspond to different forwarding beams and/or beam phases.

Optionally, the processor 610 is further configured to receive third indication information transmitted by the network device through a radio frequency unit, where
the third indication information is time-frequency resource configuration information of the third reference signal, the third indication information corresponds to at least M*N transmission occasions, N is less than or equal to a quantity of beam directions of the forwarded signal of the auxiliary device, and M is less than or equal to a quantity of beam phases of the forwarded signal of the auxiliary device.

Optionally, the processor 610 is further configured to measure the third reference signal to obtain third measurement information, where the third measurement information is used for indicating an optimal combination of a beam direction and a beam phase of a forwarded signal of the auxiliary device and a sub-band in a bandwidth of the third reference signal; and/or
measure the third reference signal to obtain fourth measurement information, where the fourth measurement information is information used for indicating optimal sub-bands corresponding to M beam phases corresponding to an optimal beam direction of the forwarded signal of the auxiliary device in a bandwidth of the third reference signal.

Optionally, the processor 610 is further configured to measure, for a semi-persistent scheduling service, the reference signal according to a beam training periodicity or after receiving a beam training indication to obtain measurement information, where
the reference signal includes a first reference signal and a second reference signal, or the reference signal includes a second reference signal;
the measurement information includes first measurement information and second measurement information in a case that the reference signal includes the first reference signal and the second reference signal; and
the measurement information includes the second measurement information in a case that the reference signal includes the second reference signal.

Optionally, the processor 610 is further configured to measure, for a dynamic scheduling service, the reference signal according to a beam training periodicity or after receiving a beam training indication to obtain measurement information, where
the reference signal includes a first reference signal and a second reference signal, or the reference signal includes a third reference signal;
the measurement information includes first measurement information and second measurement information in a case that the reference signal includes the first reference signal and the second reference signal; and
the measurement information includes third measurement information and/or fourth measurement information in a case that the reference signal is the third reference signal.

Optionally, the processor 610 is further configured to measure channel state information CSI of each sub-band at different transmission occasions of the second reference signal or the third reference signal; and report the CSI of the sub-band at different transmission occasions of the second reference signal or the third reference signal to the network device, where
different transmission occasions of the second reference signal or the third reference signal correspond to different forwarding modes of the auxiliary device.

Optionally, the processor 610 is further configured to report CSI of an optimal sub-band at each transmission occasion of the second reference signal; or
report CSI of an optimal sub-band at each transmission occasion of the third reference signal.

Optionally, the processor 610 is further configured to determine CSI of an optimal sub-band combination and report the CSI of an optimal sub-band combination to the network device according to sub-band CSI of M transmission occasions, where
the sub-band combination includes M frequency hopping sub-bands paired according to a frequency hopping rule, and the M frequency hopping sub-bands correspond to M transmission occasions of the second reference signal, or the M frequency hopping subbands correspond to M transmission occasions of the third reference signal.

In the terminal device of this embodiment of this application, at least two reference signals used for beam training and forwarded by an auxiliary device are measured in at least two forwarding modes to obtain measurement information; and the measurement information is reported to the network device, so that the network device may determine an optimal beam direction and an optimal beam phase of the forwarded signal of the auxiliary device. Further, based on the optimal beam direction and the beam phase, the influence of frequency selective fading caused by the multipath environment may be reduced.

Figure 7:
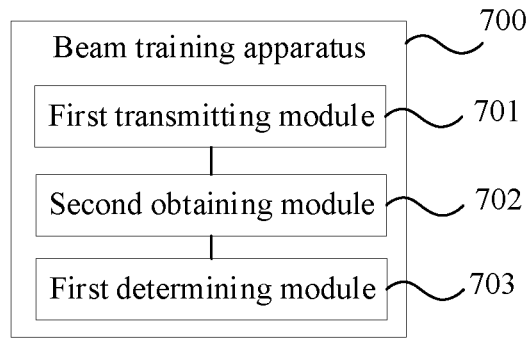
FIG. 7 is a schematic diagram 2 of a module of a beam training apparatus according to an embodiment of this application.

As shown in FIG. 7, this embodiment of this application further provides a beam training apparatus 700, applied to a network device, and the apparatus including:

a first transmitting module 701, configured to transmit at least two reference signals used for beam training;

a second obtaining module 702, configured to obtain measurement information reported by a terminal device, where the measurement information is obtained after the terminal device measures the at least two reference signals used for beam training and forwarded by an auxiliary device in at least two forwarding modes, and a forwarding mode of the auxiliary device is determined by using a beam direction of a forwarded signal of the auxiliary device and a beam phase of the forwarded signal of the auxiliary device; and a first determining module 703, configured to determine an optimal forwarding mode of the auxiliary device according to the measurement information.

In the beam training apparatus of this embodiment of this application, at least two reference signals used for beam training are transmitted; measurement information reported by a terminal device is obtained; and according to the measurement information, the optimal forwarding mode of the auxiliary device is determined, that is, the optimal beam direction and the optimal beam phase of the auxiliary device are determined, so that the influence of frequency selective fading may be improved by controlling the multipath phase.

In the beam training apparatus of this embodiment of this application, the reference signal includes a first reference signal and a second reference signal;

the first reference signal is a reference signal used for determining a beam direction of the auxiliary device; and the second reference signal is a reference signal used for determining a beam phase of the auxiliary device.

The beam training apparatus of this embodiment of this application further includes:

a second transmitting module, configured to transmit first indication information and second indication information to the terminal device before the second obtaining module obtains the measurement information reported by the terminal device, where the first indication information is time-frequency resource configuration information of the first reference signal, the first indication information corresponds to at least N transmission occasions, and N is less than or equal to a quantity of beam directions of the forwarded signal of the auxiliary device; and the second indication information is time-frequency resource configuration information of the second reference signal, the second indication information corresponds to at least M transmission occasions, and M is less than or equal to a quantity of beam phases of the forwarded signal of the auxiliary device.

The beam training apparatus of this embodiment of this application further includes:

a third transmitting module, configured to transmit first configuration information and second configuration information to the auxiliary device before the second obtaining module obtains the measurement information reported by the terminal device, where the first configuration information is time domain configuration information of beam directions of N forwarded signals of the auxiliary device, and the time domain configuration information is in one-to-one correspondence with N transmission occasions of the first reference signal; and the second configuration information is time domain configuration information of M beam phases corresponding to an optimal beam direction of the auxiliary device, the time domain configuration information is in one-to-one correspondence with M transmission occasions of the second reference signal, and the optimal beam direction is determined by using the first reference signal.

In the beam training apparatus of this embodiment of this application, the measurement information includes first measurement information and second measurement information;

the first measurement information is used for indicating an optimal beam direction of the forwarded signal of the auxiliary device in a bandwidth of the first reference signal; and the second measurement information is used for indicating an optimal beam phase corresponding to the optimal beam direction of the forwarded signal of the auxiliary device in a bandwidth of the second reference signal.

In the beam training apparatus of this embodiment of this application, the reference signal is a third reference signal;

the third reference signal is a reference signal used for determining a beam direction and a beam phase of the auxiliary device, and a quantity of transmission occasions of the third reference signal is M*N, where N is a quantity of beam directions of the forwarded signal of the auxiliary device and configured by the network device, and M is a quantity of beam phases of each forwarding beam and configured by the network device, each transmission occasion of the third reference signal corresponds to one beam direction and one beam phase of the auxiliary device, and different beam training signals correspond to different forwarding beams and/or beam phases.

The beam training apparatus of this embodiment of this application further includes:

a fourth transmitting module, configured to transmit third indication information to the terminal device before the second obtaining module obtains the measurement information reported by the terminal device, where the third indication information is time-frequency resource configuration information of the third reference signal, the third indication information corresponds to at least M*N transmission occasions, N is less than or equal to a quantity of beam directions of the forwarded signal of the auxiliary device, and M is less than or equal to a quantity of beam phases of the forwarded signal of the auxiliary device.

The beam training apparatus of this embodiment of this application further includes:

a fifth transmitting module, configured to transmit third configuration information to the auxiliary device, where
the third configuration information is time domain configuration information of beam directions and beam phases of M*N forwarded signals of the auxiliary device, and the time domain configuration information is in one-to-one correspondence with M*N transmission occasions of the third reference signal.

In the beam training apparatus of this embodiment of this application, the measurement information includes third measurement information and/or fourth measurement information, where
the third measurement information is information used for indicating an optimal combination of a beam direction and a beam phase of a forwarded signal of the auxiliary device and a sub-band in a bandwidth of the third reference signal; and
the fourth measurement information is information used for indicating optimal sub-bands corresponding to M beam phases corresponding to an optimal beam direction of the forwarded signal of the auxiliary device in a bandwidth of the third reference signal.

In the beam training apparatus of this embodiment of this application, for a semi-persistent scheduling service, the reference signal includes a first reference signal and a second reference signal, or the reference signal includes a second reference signal;
the measurement information includes first measurement information and second measurement information in a case that the reference signal includes the first reference signal and the second reference signal; and
the measurement information includes the second measurement information in a case that the reference signal includes the second reference signal.

In the beam training apparatus of this embodiment of this application, for a dynamic scheduling service, the reference signal includes a first reference signal and a second reference signal; or the reference signal includes a third reference signal;
the measurement information includes first measurement information and second measurement information in a case that the reference signal includes the first reference signal and the second reference signal; and
the measurement information includes third measurement information and/or fourth measurement information in a case that the reference signal is the third reference signal;
the third measurement information is information used for indicating an optimal combination of a beam direction and a beam phase of a forwarded signal of the auxiliary device and a sub-band in a bandwidth of the third reference signal; and
the fourth measurement information is information used for indicating optimal sub-bands corresponding to M beam phases corresponding to an optimal beam direction of the forwarded signal of the auxiliary device in a bandwidth of the third reference signal.

The beam training apparatus of this embodiment of this application further includes:
a third receiving module, configured to receive sub-band CSI information reported by the terminal device, where the sub-band CSI information corresponds to measurement information of sub-band CSI at different transmission occasions of the second reference signal or the third reference signal.

In the beam training apparatus of this embodiment of this application, the sub-band CSI information includes CSI of an optimal sub-band at each transmission occasion of the second reference signal; or
the sub-band CSI information includes CSI of an optimal sub-band at each transmission occasion of the third reference signal; or
the sub-band CSI information is CSI of an optimal sub-band combination, where
the sub-band combination includes M frequency hopping sub-bands paired according to a frequency hopping rule, and the M frequency hopping sub-bands correspond to M transmission occasions of the second reference signal, or the M frequency hopping sub-bands correspond to M transmission occasions of the third reference signal.

The beam training apparatus of this embodiment of this application further includes:
a transmission module, configured for the first determining module to schedule data transmission by using an optimal combination of the sub-band and the optimal forwarding mode after determining the optimal forwarding mode of the auxiliary device according to the measurement information.

In the beam training apparatus of this embodiment of this application, the transmission module is configured to perform data transmission on an optimal sub-band, where the optimal sub-band is a sub-band in the optimal combination; or
sequentially perform data transmission on M frequency hopping sub-bands of the sub-band combination in a frequency hopping manner.

In the beam training apparatus of this embodiment of this application, before the scheduling data transmission by using an optimal combination of a sub-band and the optimal forwarding mode, the apparatus further includes:
a sixth transmitting module, configured to transmit fourth configuration information to the auxiliary device, where the fourth configuration information indicates the optimal forwarding mode of the auxiliary device corresponding to an optimal sub-band used for data transmission; or
transmit fifth configuration information to the auxiliary device, where the fifth configuration information indicates forwarding modes of M auxiliary devices corresponding to M sub-bands used for data transmission.

The beam training apparatus of this embodiment of this application further includes:
a control module, configured to control a beam phase of the auxiliary device in at least one of the following manners;
perform offset processing on array information of a forwarding beam of the auxiliary device; or
calculate array information of a forwarding beam of the auxiliary device according to different discretization indicators.

In the beam training apparatus of this embodiment of this application, at least two reference signals used for beam training are transmitted; measurement information reported by a terminal device is obtained; and according to the measurement information, the optimal forwarding mode of the auxiliary device is determined, that is, the optimal beam direction and the optimal beam phase of the auxiliary device are determined, so that the influence of frequency selective fading may be improved by controlling the multipath phase.

Figure 8:
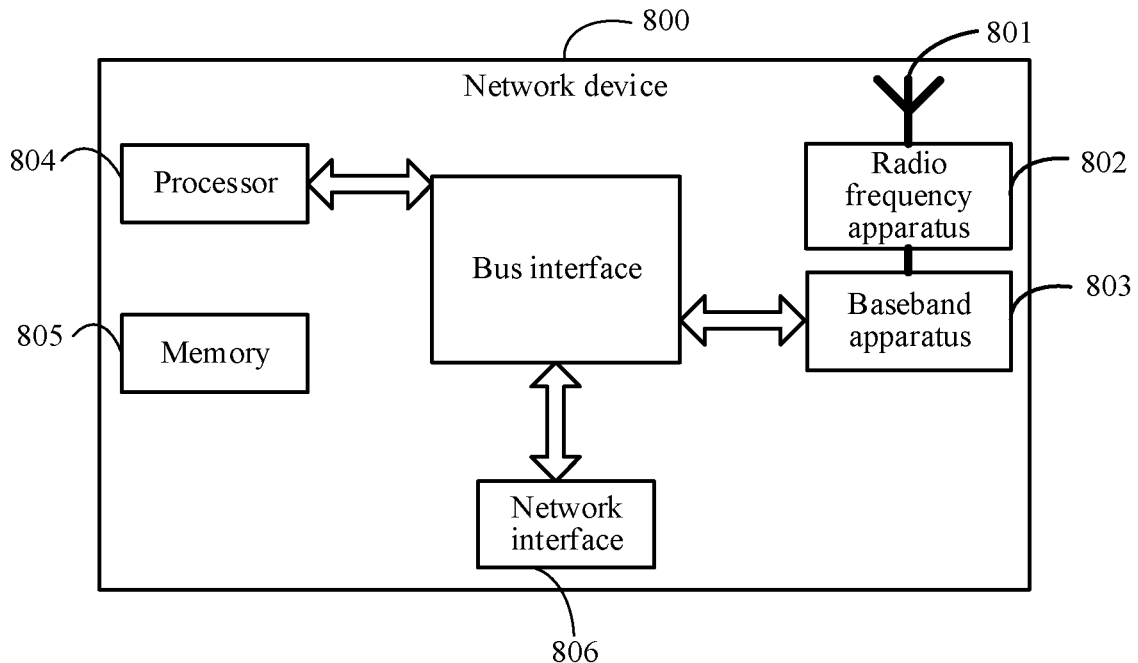
FIG. 8 is a structural block diagram of a network device according to an embodiment of this application.

Specifically, an embodiment of this application further provides a network device. As shown in FIG. 8, the network device 800 includes: an antenna 801, a radio frequency apparatus 802, and a baseband apparatus 803. The antenna 801 is connected with the radio frequency apparatus 802. In an uplink direction, the radio frequency apparatus 802 receives information through the antenna 801, and transmits the received information to the baseband apparatus 803 for processing. In a downlink direction, the baseband apparatus 803 performs processing on the to-be-transmitted information, and transmits the to-be-transmitted information to the radio frequency apparatus 802. After performing processing on the received information, the radio frequency apparatus 802 transmits the received information out through the antenna 81.

The frequency band processing apparatus may be located in the baseband apparatus 803, and the method performed by the network device in the foregoing embodiments may be implemented in the baseband apparatus 803. The baseband apparatus 803 includes a processor 804 and a memory 805.

The baseband apparatus 803 may include, for example, at least one baseband board, and a plurality of chips are arranged on the baseband board. As shown in FIG. 8, for example, one of the chips is a processor 804, and is connected with the memory 805, to invoke the program in the memory 805, and to perform the network device operation shown in the foregoing method embodiments.

The baseband apparatus 803 may further include a network interface 806 used for exchanging information with the radio frequency apparatus 802. For example, the interface is a common public radio interface (CPRI).

Specifically, the network device of this embodiment of the present disclosure further includes: an instruction or program stored on the memory 805 and executable on the processor 804. The processor 804 invokes the instruction or program in the memory 805 to perform the method performed by each module shown in FIG. 7, and implements the same technical effect, which will not be described in detail herein again to avoid repetition.

This embodiment of this application further provides a readable storage medium storing therein a program or instruction. The program or instruction, when executed by a processor, implements various processes of the embodiments of the beam training method, and the same technical effects may be achieved, which will not be described in detail herein again to avoid repetition.

The processor is a processor in the terminal device described in the foregoing embodiment. The readable storage medium includes a computer-readable storage medium, for example, a Read-Only Memory (ROM), a Random Access Memory (RAM), a magnetic disk, an optical disc or the like.

This embodiment of this application further provides a chip. The chip includes a processor and a communication interface. The communication interface is coupled to the processor. The processor is configured to run a program or instruction on a network device to implement various processes of the beam training method embodiment, and the same technical effects may be achieved, which will not be described in detail herein again to avoid repetition.

It should be understood that, the chip mentioned in this embodiment of this application may also be referred to as a system-level chip, a system chip, a chip system, a system on chip, or the like.

It is to be noted that, the term "include", "comprise" or any other variation thereof in this specification intends to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A beam training method, performed by a terminal device, and the method comprising:
   measuring at least two reference signals used for beam training and forwarded by an auxiliary device in at least two forwarding modes to obtain measurement information, wherein the reference signals are sent by a network device to the auxiliary device and forwarded by the auxiliary device to the terminal device, the measurement information is used for indicating an optimal forwarding mode of the auxiliary device, and a forwarding mode of the auxiliary device is determined by using a beam direction of a forwarded signal of the auxiliary device and a beam phase of the forwarded signal of the auxiliary device; and
   reporting the measurement information to the network device.

2. The beam training method according to claim 1, wherein the reference signal comprises a first reference signal and a second reference signal;
   the first reference signal is a reference signal transmitted by the network device and used for determining a beam direction of the auxiliary device; and
   the second reference signal is a reference signal transmitted by the network device and used for determining a beam phase of the auxiliary device.

3. The beam training method according to claim 2, wherein before the measuring at least two reference signals used for beam training and forwarded by an auxiliary device in at least two forwarding modes, the method further comprises:

receiving first indication information and second indication information transmitted by the network device, wherein the first indication information is time-frequency resource configuration information of the first reference signal, the first indication information corresponds to at least N transmission occasions, and N is less than or equal to a quantity of beam directions of the forwarded signal of the auxiliary device; and the second indication information is time-frequency resource configuration information of the second reference signal, the second indication information corresponds to at least M transmission occasions, and M is less than or equal to a quantity of beam phases of the forwarded signal of the auxiliary device.

4. The beam training method according to claim 2, wherein a bandwidth of the first reference signal is greater than or equal to a preset bandwidth threshold.

5. The beam training method according to claim 2, wherein a first frequency range corresponding to the second reference signal is greater than or equal to a second frequency range, and the second frequency range is a frequency range corresponding to data transmission between the terminal device and the network device.

6. The beam training method according to claim 2, wherein the measuring at least two reference signals used for beam training and forwarded by an auxiliary device in at least two forwarding modes to obtain measurement information comprises:

measuring the first reference signal to obtain first measurement information, wherein the first measurement information is used for indicating an optimal beam direction of the forwarded signal of the auxiliary device in a bandwidth of the first reference signal; and measuring the second reference signal to obtain second measurement information, wherein the second measurement information is used for indicating an optimal beam phase corresponding to the optimal beam direction of the forwarded signal of the auxiliary device in a bandwidth of the second reference signal.

7. The beam training method according to claim 1, wherein the reference signal is a third reference signal;

the third reference signal is a reference signal transmitted by the network device and used for determining a beam direction and a beam phase of the auxiliary device, and a quantity of transmission occasions of the third reference signal is M*N, wherein N is a quantity of beam directions of the forwarded signal of the auxiliary device and configured by the network device, and M is a quantity of beam phases of each forwarding beam and configured by the network device, each transmission occasion of the third reference signal corresponds to one beam direction and one beam phase of the auxiliary device, and different beam training signals correspond to different forwarding beams and/or beam phases.

8. The beam training method according to claim 7, wherein before the measuring at least two reference signals used for beam training and forwarded by an auxiliary device in at least two forwarding modes, the method further comprises:

receiving third indication information transmitted by the network device, wherein the third indication information is time-frequency resource configuration information of the third reference signal, the third indication information corresponds to at least M*N transmission occasions, N is less than or equal to a quantity of beam directions of the forwarded signal of the auxiliary device, and M is less than or equal to a quantity of beam phases of the forwarded signal of the auxiliary device.

9. The beam training method according to claim 7, wherein the measuring at least two reference signals used for beam training and forwarded by an auxiliary device in at least two forwarding modes comprises:

measuring the third reference signal to obtain third measurement information, wherein the third measurement information is information used for indicating an optimal combination of a beam direction and a beam phase of a forwarded signal of the auxiliary device and a sub-band in a bandwidth of the third reference signal; and/or measuring the third reference signal to obtain fourth measurement information, wherein the fourth measurement information is information used for indicating optimal sub-bands corresponding to M beam phases corresponding to an optimal beam direction of the forwarded signal of the auxiliary device in a bandwidth of the third reference signal.

10. The beam training method according to claim 2, wherein the measuring at least two reference signals used for beam training and forwarded by an auxiliary device in at least two forwarding modes comprises:

for a semi-persistent scheduling service, measuring the reference signal according to a beam training periodicity or after receiving a beam training indication to obtain measurement information, wherein the reference signal comprises a first reference signal and a second reference signal, or the reference signal comprises a second reference signal;

the measurement information comprises first measurement information and second measurement information in a case that the reference signal comprises the first reference signal and the second reference signal; and the measurement information comprises the second measurement information in a case that the reference signal comprises the second reference signal.

11. The beam training method according to claim 1, wherein the measuring at least two reference signals used for beam training and forwarded by an auxiliary device in at least two forwarding modes comprises:

for a dynamic scheduling service, measuring the reference signal according to a beam training periodicity or after receiving a beam training indication to obtain measurement information, wherein the reference signal comprises a first reference signal and a second reference signal, or the reference signal comprises a third reference signal;

the measurement information comprises first measurement information and second measurement information in a case that the reference signal comprises the first reference signal and the second reference signal; and the measurement information comprises third measurement information and/or fourth measurement information in a case that the reference signal is the third reference signal.

12. The beam training method according to claim 11, further comprising:

measuring channel state information (CSI) of each sub-band at different transmission occasions of the second reference signal or the third reference signal; and reporting the CSI of the sub-band at different transmission occasions of the second reference signal or the third reference signal to the network device, wherein different transmission occasions of the second reference signal or the third reference signal correspond to different forwarding modes of the auxiliary device.

13. The beam training method according to claim 12, wherein the reporting the CSI of the sub-band at different transmission occasions of the second reference signal or the third reference signal to the network device comprises:

reporting CSI of an optimal sub-band at each transmission occasion of the second reference signal; or reporting CSI of an optimal sub-band at each transmission occasion of the third reference signal.

14. The beam training method according to claim 12, wherein the reporting the CSI of the sub-band at different transmission occasions of the second reference signal or the third reference signal to the network device comprises:

determining CSI of an optimal sub-band combination and reporting the CSI of an optimal sub-band combination to the network device according to sub-band CSI of M transmission occasions, wherein the sub-band combination comprises M frequency hopping sub-bands paired according to a frequency hopping rule, and the M frequency hopping sub-bands correspond to M transmission occasions of the second reference signal, or the M frequency hopping sub-bands correspond to M transmission occasions of the third reference signal.

15. A terminal device, comprising a processor, a memory, and a program or instruction stored in the memory and executable on the processor, the processor executes the computer program to:

measure at least two reference signals used for beam training and forwarded by an auxiliary device in at least two forwarding modes to obtain measurement information, wherein the reference signals are sent by a network device to the auxiliary device and forwarded by the auxiliary device to the terminal device, the measurement information is used for indicating an optimal forwarding mode of the auxiliary device, and a forwarding mode of the auxiliary device is determined by using a beam direction of a forwarded signal of the auxiliary device and a beam phase of the forwarded signal of the auxiliary device; and report the measurement information to the network device.

16. The terminal device according to claim 15, wherein the reference signal comprises a first reference signal and a second reference signal;

the first reference signal is a reference signal transmitted by the network device and used for determining a beam direction of the auxiliary device; and the second reference signal is a reference signal transmitted by the network device and used for determining a beam phase of the auxiliary device.

17. The terminal device according to claim 16, wherein the processor executes the computer program to:

receive first indication information and second indication information transmitted by the network device, wherein the first indication information is time-frequency resource configuration information of the first reference signal, the first indication information corresponds to at least N transmission occasions, and N is less than or equal to a quantity of beam directions of the forwarded signal of the auxiliary device; and the second indication information is time-frequency resource configuration information of the second reference signal, the second indication information corresponds to at least M transmission occasions, and M is less than or equal to a quantity of beam phases of the forwarded signal of the auxiliary device.

18. The terminal device according to claim 16, wherein a bandwidth of the first reference signal is greater than or equal to a preset bandwidth threshold.

19. The terminal device according to claim 16, wherein a first frequency range corresponding to the second reference signal is greater than or equal to a second frequency range, and the second frequency range is a frequency range corresponding to data transmission between the terminal device and the network device.

20. A network device, comprising a processor, a memory, and a program or instruction stored in the memory and executable on the processor, the processor executes the computer program to:

transmit at least two reference signals used for beam training;

obtain measurement information reported by a terminal device, wherein the measurement information is obtained after the terminal device measures the at least two reference signals used for beam training and forwarded by an auxiliary device in at least two forwarding modes, the reference signals are sent by the network device to the auxiliary device and forwarded by the auxiliary device to the terminal device, and a forwarding mode of the auxiliary device is determined by using a beam direction of a forwarded signal of the auxiliary device and a beam phase of the forwarded signal of the auxiliary device; and determine an optimal forwarding mode of the auxiliary device according to the measurement information.

* * * * *